M. F. BAYER.
CASTER LOCK.
APPLICATION FILED FEB. 5, 1920.
1,428,932. Patented Sept. 12, 1922.
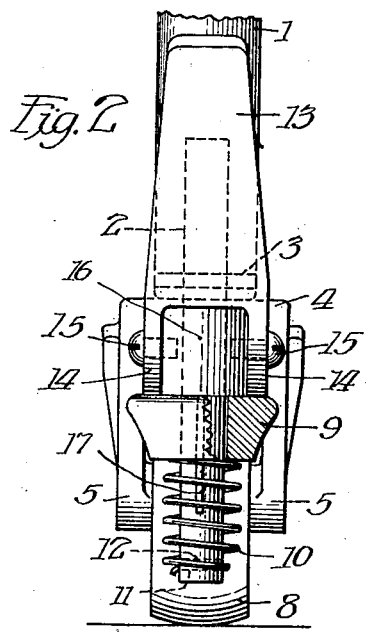
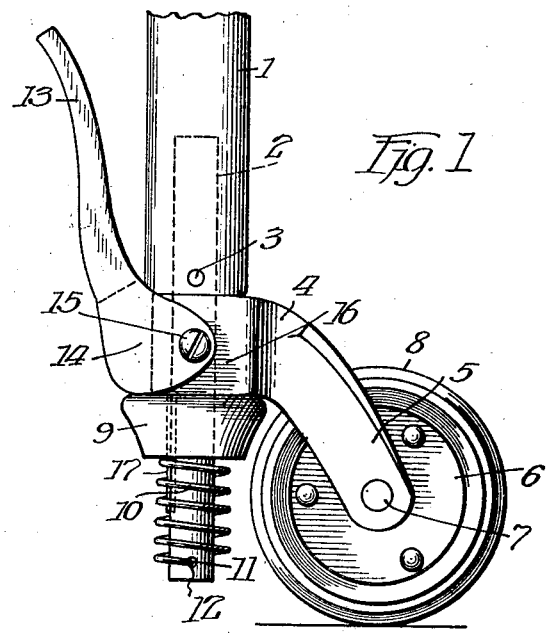
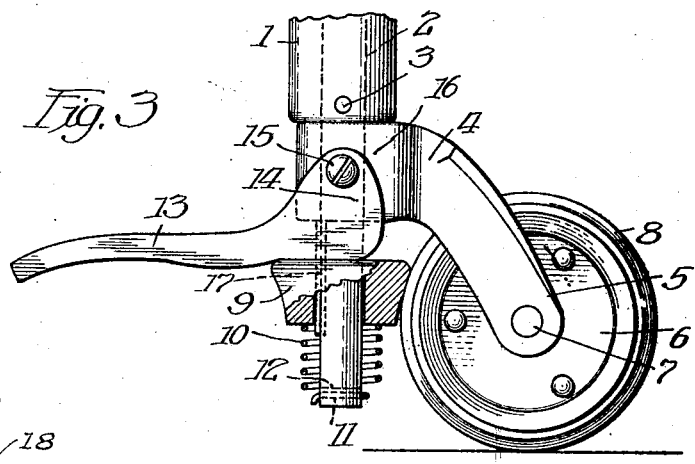
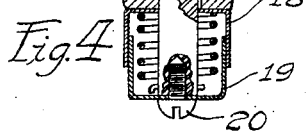
Inventor
Matthew F. Bayer,
By Fisher, Fowle, Clapp & Soans
attys Patented Sept. 12, 1922.

1,428,932

UNITED STATES PATENT OFFICE.

MATTHEW F. BAYER, OF KENOSHA, WISCONSIN, ASSIGNOR TO SIMMONS COMPANY, OF KENOSHA, WISCONSIN, A CORPORATION OF DELAWARE.

CASTER LOCK.

Application filed February 5, 1920. Serial No. 356,385.

*To all whom it may concern:*

Be it known that I, MATTHEW F. BAYER, a citizen of the United States, residing in the city of Kenosha, county of Kenosha, and State of Wisconsin, have invented certain new and useful Improvements in Caster Locks, of which the following is a specification.

My invention has reference more particularly to an improved caster wherein a locking device is employed for simultaneously locking the caster wheel from rotation and the caster wheel arm or bracket from swinging movement around its vertical axis.

Caster wheel locks which have been provided heretofore, have been of a somewhat complicated and expensive construction and could not be attached in the same manner as and used in place of the ordinary caster wheels which are commonly used, but required a special form of attachment and special construction of standard or leg to which it was attached, and most of such devices were also arranged so that the locking or release of the caster wheel necessitated elevating the bed or other article supported by the caster.

The principal objects of my invention are to provide an improved caster and locking device therefor for simultaneously locking the caster wheel against rotation and the caster wheel bracket against swinging movement on its vertical axis; to construct same so that it may be readily applied in place of the ordinary caster; to utilize a caster wheel bracket of ordinary form so as to obviate the necessity of special patterns and substantial changes in supplying the caster with a lock, to provide a device of this character which may be advantageously employed in connection with a rubber tired caster wheel, and in general, to provide an improved, simple and inexpensive caster and lock which may be readily applied to any device in place of the ordinary caster.

On the drawings, Fig. 1 is a side view of the device connected to the fragmentary lower portion of a leg support, such as the post of a bed, and showing the caster wheel released;

Fig. 2 is a view of the structure shown in Fig. 1, looking at the left hand side thereof, with a portion of the locking collar broken away;

Fig. 3 is a view similar to Fig. 1, showing the parts in locking position, and

Fig. 4 is a fragmentary section of a modification.

Referring to the drawings, the reference numeral 1 indicates a fragmentary portion of the leg of an article supported by the caster wheel, as for example the post of a bed, which leg is of tubular form or bored out at the lower end to afford a socket into which the upper end of the pin 2 is inserted, said pin being locked in place in any suitable manner, as for example by the pin 3. A caster wheel arm or bracket 4 is formed with a hub 16 which encircles the stem 2 so as to swing about said stem, and the outer end of this arm 4 is bifurcated to provide the spaced arms 5 between which the caster wheel 6 is pivotally supported on the pin or spindle 7, secured to the outer ends of the arms 5. This device is particularly suited for use in connection with hospital beds, and when so employed I prefer to equip the caster wheel 6 with a rubber tire 8.

The stem 2 projects some distance below the portion of the bracket 4 which encircles the stem, and has a collar 9 mounted thereon to slide lengthwise of the stem and preferably held against rotation by a spline 17, and this collar is peripherally shaped as shown, so that when pressed downwardly along the stem 2 sufficiently to engage the rim of the wheel 6, the face thereof conforms to the curvature of the wheel rim at the place of engagement therewith. A coil spring 10 is mounted on the stem 2 below and bearing against the collar 9, has the lower end suitably bent as indicated at 11, and secured in an aperture 12 at the lower end of the stem 2 for the purpose of retaining the spring on the stem.

A lever 13 is divided at one end to straddle the hub 16 of the arm 4, and each of the corresponding side portions of this lever 14 is secured to the corresponding side of the hub 16 by means of a cap screw 15, said screws being in axial alignment. The side portions 14 of the lever 13 are of a cam shape, arranged so that when the lever is thrown up into the position shown in Fig. 1, the collar 9 is elevated by the spring 10 out of engagement with the wheel 6, and bears against the bottom of the hub 16 of the arm 4, whereas when the lever 13 is thrown downwardly to the position shown in Fig. 3, the said side portions 14 slide the collar 9 downwardly against the tension of the spring 10 and cause the portion of the rim of the collar adjacent the wheel 6 to clamp against the rim of the wheel 6. Owing to the direction of movement of the collar 8 and the curvature of the rim of the wheel 6 at the point engaged by the collar, a wedge-like engagement results which insures clamping of the wheel against rotation on the spindle 7, and in the case of the rubber-tired wheel this engagement, of course, becomes more secure. A similar result may be obtained in case a metal or wooden rim wheel is employed by surrounding the collar 9 with an annular ring of rubber, and either construction affords sufficient give between the collar 9 and the wheel 6 so that as the lever 13 is thrown down to the definite position shown in Fig. 3, a resilient or yielding resistance is afforded as the collar engages the wheel instead of an abrupt resistance as the case would be if the collar and wheel rim were both of a solid unyielding character.

When the lever 13 is thrown downward to the locking position and the collar 9 engaged against the wheel 6, said collar being held against turning movement on the stem by the spline 17, serves to lock the arm against swinging movement around the stem 2.

The construction just described is particularly advantageous as it utilizes a caster construction similar to that which is commonly used, it being customary to employ an arm and caster wheel somewhat similar to the arm 4 and caster wheel 6 and attach same to the leg of the supported article by a pin or stem which is passed loosely through the hub 16 of the caster wheel bracket and secured in a socket in the lower end of the leg or post of the article supported. Consequently, this device may be readily applied in place of any standard form of caster, thus enabling either the locking type or the ordinary type of caster to be furnished without special construction of caster wheel and caster wheel arm, and the same patterns or parts may be used for both forms.

In some caster wheels a disk or plate is employed instead of a stem to connect the caster with the supported article, said plate being screwed or otherwise secured to the leg or some bottom portion of the supported article. This form of attachment may of course be readily used with my invention.

In Fig. 4 I have shown the spring 10 enclosed in a pair of telescopically arranged ferrules 18 and 19, the latter being secured on the end of the shaft by means of the screw 20. This construction is more sightly and sanitary, and will not pick up threads or other material.

While I have shown and described a particular form in which my invention may be embodied, I am aware that various changes and modifications may be made without departing from the principles of my invention, the scope of which is to be determined by the appended claims.

I claim as my invention:

1. In a device of the class described, the combination of a caster wheel bracket having a caster wheel thereon, a locking caster wheel device, and a lever for operating the locking device, all carried on and held in co-operative relation by a vertical stem.

2. In a device of the class described, the combination with a supported part having a depending stem, of a caster wheel bracket having a caster wheel mounted thereon, a caster wheel brake, and a brake operating member all carried by said stem.

3. In a device of the class described, the combination of a supported part having a reduced depending extension, a caster wheel bracket pivoted on said extension and having a caster wheel thereon spaced laterally from said extension, a locking member slidable on said extension to engage the caster wheel, and an operating member mounted on the bracket for controlling the adjustment of the locking device.

4. The combination with a supported part of a caster wheel bracket pivoted on the supported part and having a caster wheel mounted thereon, means extending below said bracket and provided with a shiftable locking member adapted to engage the caster wheel, and an operating member mounted independently of the supported part and operable to regulate the adjustment of the locking member.

5. In a device of the class described, the combination of a supported part having a stem, a member pivoted on the stem and carrying a caster wheel, a brake member on the stem and a lever pivoted on one of said members and operable to cause relative movement of said members and thereby engage the brake member against the periphery of the caster wheel.

6. In a device of the class described, the combination of a caster wheel bracket, a supporting stem extending vertically through the caster wheel bracket and having an extension thereabove adapted to be inserted in a socket of a supported part and having an extension below the bracket with a locking member slidable thereon and resiliently held in an elevated position, a caster wheel on the bracket disposed laterally of the last mentioned extension and adapted to be engaged by the locking member, and an operating member on the caster wheel bracket for forcing the locking member downwardly into engagement with the rim of the caster wheel.

7. In a device of the class described, the combination of a caster wheel bracket pivoted on a vertical axis and having a caster wheel thereon disposed laterally from said axis, a locking device for the caster wheel, and a lever movably around said axis and operable in various positions therearound to adjust the locking device.

8. In a device of the class described, the combination of a vertical stem, a caster wheel carried by and movable circularly around the axis of the stem, a brake movable axially of the stem to engage the periphery of the caster wheel, and a lever movable circularly around the axis of the stem and vertically oscillatable for imparting axial movement to the brake.

9. In a device of the class described, the combination of a caster wheel bracket pivoted on a vertical axis and having a caster wheel thereon disposed laterally from said axis, a locking member for the caster wheel resiliently held in the released position, and a cam operable to clamp the locking member against the caster wheel.

10. In a device of the class described, the combination of a caster wheel bracket pivoted on a vertical axis and having a caster wheel thereon disposed laterally from the vertical axis, a locking member, a cam for engaging the locking member with the caster wheel and means affording yieldable interengagement of the locking member with the caster wheel.

11. The combination with a supported part having a vertical socket and a stem adapted to be secured in the socket of a caster wheel unit comprising a caster wheel bracket having a caster wheel thereon, a locking device for the caster wheel, and an operating member for said locking device, all carried on the stem and held in co-operative relation thereon by the engagement of the stem in the socket.

12. In a device of the class described the combination of a brake, a caster wheel movable circularly around and adapted to engage at different points on the periphery of the brake, means for holding the brake against circular movement with the caster wheel and a lever for causing relative movement of the brake and caster wheel for controlling the engagement thereof.

13. In a device of the class described, the combination of an upright stem, a caster wheel carried by and movable circularly around the stem, a collar on and movable axially of the stem and adapted to engage the periphery of the caster wheel, a spring on the stem exerting tension to hold the collar away from the caster wheel and a lever having a cam operable to depress the collar against the tension of the spring, and engage the periphery thereof against the periphery of the caster wheel.

14. In a device of the class described, the combination of a post having a reduced extension, a collar keyed on and movable axially of the extension, a bracket pivoted on the extension between the collar and the post, a caster wheel on the bracket disposed laterally from the extension and projecting under the collar, a spring on the stem exerting tension on the collar so as to hold the latter elevated against the bracket and out of engagement with the caster wheel and a lever pivoted on the bracket and having a cam for depressing and holding the collar in engagement with the periphery of the caster wheel.

15. In a device of the class described, the combination of an upright stem, a bracket having a hub at one end pivoted on the stem and a caster wheel rotatably mounted at the other end, a collar on the stem and movable axially thereof to engage the periphery of the caster wheel, a spring on the stem exerting a tension to hold the collar away from the caster wheel and a lever having a bifurcated end, the two parts of which are pivoted at opposite sides of the bracket hub and provided with cam faces engaging the collar for moving same axially of the stem into engagement with the periphery of the caster wheel.

16. In a device of the class described, a combination of an upright stem, a bracket pivoted on the stem and having a caster wheel mounted thereon, a member slidable axially of the stem and adapted to engage with the periphery of the caster wheel, a spring on the stem exerting a tension to hold the member disengaged from the caster wheel, a housing for the spring comprising telescopically related sections and a lever operable to adjust the aforesaid member axially of the stem against the tension of the spring to a position of engagement with the periphery of the caster wheel.

MATTHEW F. BAYER.